US011319925B2

(12) United States Patent
Caponetti et al.

(10) Patent No.: US 11,319,925 B2
(45) Date of Patent: May 3, 2022

(54) TOWER DAMPING IN WIND TURBINE POWER PRODUCTION

(71) Applicant: VESTAS WIND SYSTEMS A/S, Aarhus N (DK)

(72) Inventors: Fabio Caponetti, Åbyhøj (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/954,186

(22) PCT Filed: Dec. 4, 2018

(86) PCT No.: PCT/DK2018/050320
§ 371 (c)(1),
(2) Date: Jun. 15, 2020

(87) PCT Pub. No.: WO2019/114897
PCT Pub. Date: Jun. 20, 2019

(65) Prior Publication Data
US 2021/0164441 A1    Jun. 3, 2021

(30) Foreign Application Priority Data

Dec. 14, 2017   (DK) ........................... PA 2017 70943

(51) Int. Cl.
*F03D 9/00*    (2016.01)
*H02P 9/04*    (2006.01)
(Continued)

(52) U.S. Cl.
CPC ......... *F03D 7/0276* (2013.01); *F03D 7/0224* (2013.01); *F03D 7/0296* (2013.01);
(Continued)

(58) Field of Classification Search
CPC .... F03D 7/0224; F03D 7/0276; F03D 7/0296; F03D 7/043; F05B 2260/966;
(Continued)

(56) References Cited

U.S. PATENT DOCUMENTS 4,420,692 A * 12/1983 Kos ........................ F03D 7/0224
290/44
4,435,647 A * 3/1984 Harner .................... F03D 7/043
290/44
(Continued)

FOREIGN PATENT DOCUMENTS

EP    1816347 A1    8/2007
EP    2063110 A1    5/2009
(Continued)

OTHER PUBLICATIONS

Danish Patent and Trademark Office, 1st Technical Examination of Patent Application PA201770943, dated May 28, 2018.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

A method for wind turbine tower damping is disclosed, as well as an associated controller and wind turbine. The method comprises determining, using one or more sensor signals, dynamic state information for a tower of a wind turbine during power production, wherein the dynamic state information comprises a tower frequency. The method further comprises determining at least one control loop gain value using the tower frequency, and generating, using the at least one control loop gain value, one or more control signals for controlling a rotational speed of a rotor of the wind turbine.

14 Claims, 7 Drawing Sheets

(51) Int. Cl.
  *F03D 7/02* (2006.01)
  *F03D 7/04* (2006.01)
(52) U.S. Cl.
  CPC ........ *F03D 7/043* (2013.01); *F05B 2260/966* (2013.01); *F05B 2270/101* (2013.01); *F05B 2270/327* (2013.01); *F05B 2270/328* (2013.01); *F05B 2270/342* (2020.08); *F05B 2270/705* (2013.01)
(58) Field of Classification Search
  CPC .......... F05B 2270/101; F05B 2270/327; F05B 2270/328; F05B 2270/342
  See application file for complete search history.

(56) References Cited

U.S. PATENT DOCUMENTS

| | | | | |
|---|---|---|---|---|
| 7,317,260 | B2* | 1/2008 | Wilson | F03D 7/0236 290/44 |
| 7,342,323 | B2* | 3/2008 | Avagliano | F03D 9/25 290/55 |
| 7,488,155 | B2* | 2/2009 | Barbu | F03D 7/042 416/1 |
| 7,692,322 | B2* | 4/2010 | Wakasa | F03D 7/0296 290/44 |
| 7,851,934 | B2* | 12/2010 | Nyborg | F03D 7/0224 290/44 |
| 7,939,955 | B2* | 5/2011 | Steiner | F03D 7/0244 290/44 |
| 8,026,623 | B2* | 9/2011 | Wakasa | F03D 7/0296 290/44 |
| 8,115,331 | B2* | 2/2012 | Wakasa | F03D 7/0296 290/44 |
| 8,299,643 | B2* | 10/2012 | Wakasa | F03D 7/0296 290/44 |
| 8,395,273 | B2* | 3/2013 | Wakasa | F03D 7/043 290/44 |
| 8,546,968 | B2* | 10/2013 | Wakasa | F03D 7/0296 290/44 |
| 8,610,298 | B2* | 12/2013 | Acedo Sanchez | F03D 7/0284 290/44 |
| 9,347,431 | B2* | 5/2016 | Esbensen | F03D 7/0204 |
| 9,624,906 | B2* | 4/2017 | Pineda Amo | F03D 80/88 |
| 9,777,708 | B2* | 10/2017 | Risager | F03D 7/024 |
| 9,810,199 | B2* | 11/2017 | Hammerum | F03D 7/042 |
| 10,030,631 | B2* | 7/2018 | Couchman | F03D 1/06 |
| 10,294,923 | B2* | 5/2019 | Kristoffersen | F03D 7/0224 |
| 10,557,456 | B2* | 2/2020 | Kjær | F03D 7/047 |
| 10,907,615 | B2* | 2/2021 | Pedersen | F03D 7/0224 |
| 2006/0033338 | A1* | 2/2006 | Wilson | F03D 13/20 290/44 |
| 2007/0075546 | A1* | 4/2007 | Avagliano | G01S 17/88 290/44 |
| 2007/0116572 | A1* | 5/2007 | Barbu | F03D 7/024 416/132 B |
| 2008/0206051 | A1* | 8/2008 | Wakasa | F03D 9/25 416/41 |
| 2009/0174186 | A1* | 7/2009 | Nyborg | F03D 9/255 290/44 |
| 2009/0295161 | A1* | 12/2009 | Steiner | F03D 7/042 290/44 |
| 2010/0111693 | A1* | 5/2010 | Wilson | F03D 7/0296 416/1 |
| 2010/0187820 | A1* | 7/2010 | Wakasa | F03D 7/0296 290/44 |
| 2010/0289266 | A1* | 11/2010 | Wortmann | F03D 7/042 290/44 |
| 2011/0156393 | A1* | 6/2011 | Wakasa | F03D 7/0224 290/44 |
| 2011/0223006 | A1* | 9/2011 | Loh | F03D 7/0224 415/118 |
| 2011/0309622 | A1* | 12/2011 | Wakasa | F03D 7/043 290/44 |
| 2012/0049516 | A1* | 3/2012 | Viassolo | F03D 9/10 290/44 |
| 2012/0292905 | A1* | 11/2012 | Slot | F03D 17/00 290/44 |
| 2013/0001947 | A1* | 1/2013 | Wakasa | F03D 7/0224 290/44 |
| 2013/0230396 | A1* | 9/2013 | Wakasa | F03D 7/043 416/1 |
| 2014/0017083 | A1* | 1/2014 | Pineda Amo | G01C 19/02 416/37 |
| 2014/0339827 | A1* | 11/2014 | Esbensen | F03D 7/0296 290/44 |
| 2014/0365042 | A1* | 12/2014 | D' Alto | B64C 19/00 701/12 |
| 2016/0123302 | A1* | 5/2016 | Couchman | F03D 17/00 416/1 |
| 2017/0022972 | A1* | 1/2017 | Kj R | F03D 7/0296 |
| 2018/0066630 | A1* | 3/2018 | Kristoffersen | F03D 7/046 |
| 2018/0142676 | A1* | 5/2018 | Pedersen | F03D 7/0224 |
| 2021/0115897 | A1* | 4/2021 | Landa | F03D 7/0224 |

FOREIGN PATENT DOCUMENTS

| | | |
|---|---|---|
| EP | 2123906 A1 | 11/2009 |
| JP | 2017053274 A | 3/2017 |
| TW | 201416549 A | 5/2014 |
| WO | 2013065323 A1 | 5/2013 |
| WO | 2017144061 A1 | 8/2017 |
| WO | 2019114897 A1 | 6/2019 |

OTHER PUBLICATIONS

PCT Written Opinion of the International Searching Authority, Application: PCT/DK2018/050320, dated May 28, 2018.

* cited by examiner

TOWER DAMPING IN WIND TURBINE POWER PRODUCTION

BACKGROUND

Field of the Invention

Embodiments presented in this disclosure generally relate to wind turbines, and more specifically, to controlling power production of a wind turbine using dynamic state information for a tower of the wind turbine.

Description of the Related Art

Wind turbines typically comprise a tower and a nacelle located at the top of the tower. Taller towers are generally beneficial for producing greater amounts of electrical energy with the wind turbine, as a taller tower can support use of a larger diameter rotor and/or disposing the rotor further from negative effects on free wind flow that occur near the ground (such as ground drag and turbulence).

Taller towers tend to be more flexible, which may give rise to dynamic interactions between tower movement and the rotor speed. For example, the wind speed (and aerodynamic torque) that is experienced by the rotor is influenced by the top motion of the tower. The power production of the wind turbine may be controlled by pitching the wind turbine blades to counter the aerodynamic torque. Pitching the wind turbine blades influences the forces acting on the tower and therefore the top motion of the tower, which in turn affects the experienced wind speed and the aerodynamic torque. In some cases, the dynamic interactions can introduce instability into the control of the wind turbine.

SUMMARY

One embodiment of the present disclosure is a method comprising determining, using one or more sensor signals, dynamic state information for a tower of a wind turbine during power production, wherein the dynamic state information comprises a tower frequency. The method further comprises determining at least one control loop gain value using the tower frequency. The method further comprises generating, using the at least one control loop gain value, one or more control signals for controlling a rotational speed of a rotor of the wind turbine.

Beneficially, the method allows mitigation of an instability introduced into the wind turbine control that results from dynamic interactions occurring between the rotor and the tower. Further, by accounting for the effects of the rotor dynamics and/or the rotor-wind relation, the wind turbine may be tuned more aggressively resulting in greater power production than would be otherwise possible.

Another embodiment described herein is a controller for a wind turbine, the controller comprising one or more computer processors, and a memory comprising computer-readable code that, when executed using the one or more computer processors, performs an operation. The operation comprises determining, using one or more sensor signals, dynamic state information for a tower of a wind turbine during power production, wherein the dynamic state information comprises a tower frequency. The operation further comprises determining at least one control loop gain value using is the tower frequency. The operation further comprises generating, using the at least one control loop gain value, one or more control signals for controlling a rotational speed of a rotor of the wind turbine.

Beneficially, the controller allows mitigation of an instability introduced into the wind turbine control that results from dynamic interactions occurring between the rotor and the tower. Further, by accounting for the effects of the rotor dynamics and/or the rotor-wind relation, the wind turbine may be tuned more aggressively resulting in greater power production than would be otherwise possible.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments disclosed herein describe techniques for acquiring dynamic state information for a tower of a wind turbine during power production, and for controlling operation of the wind turbine based on the dynamic state information.

Figure 1:
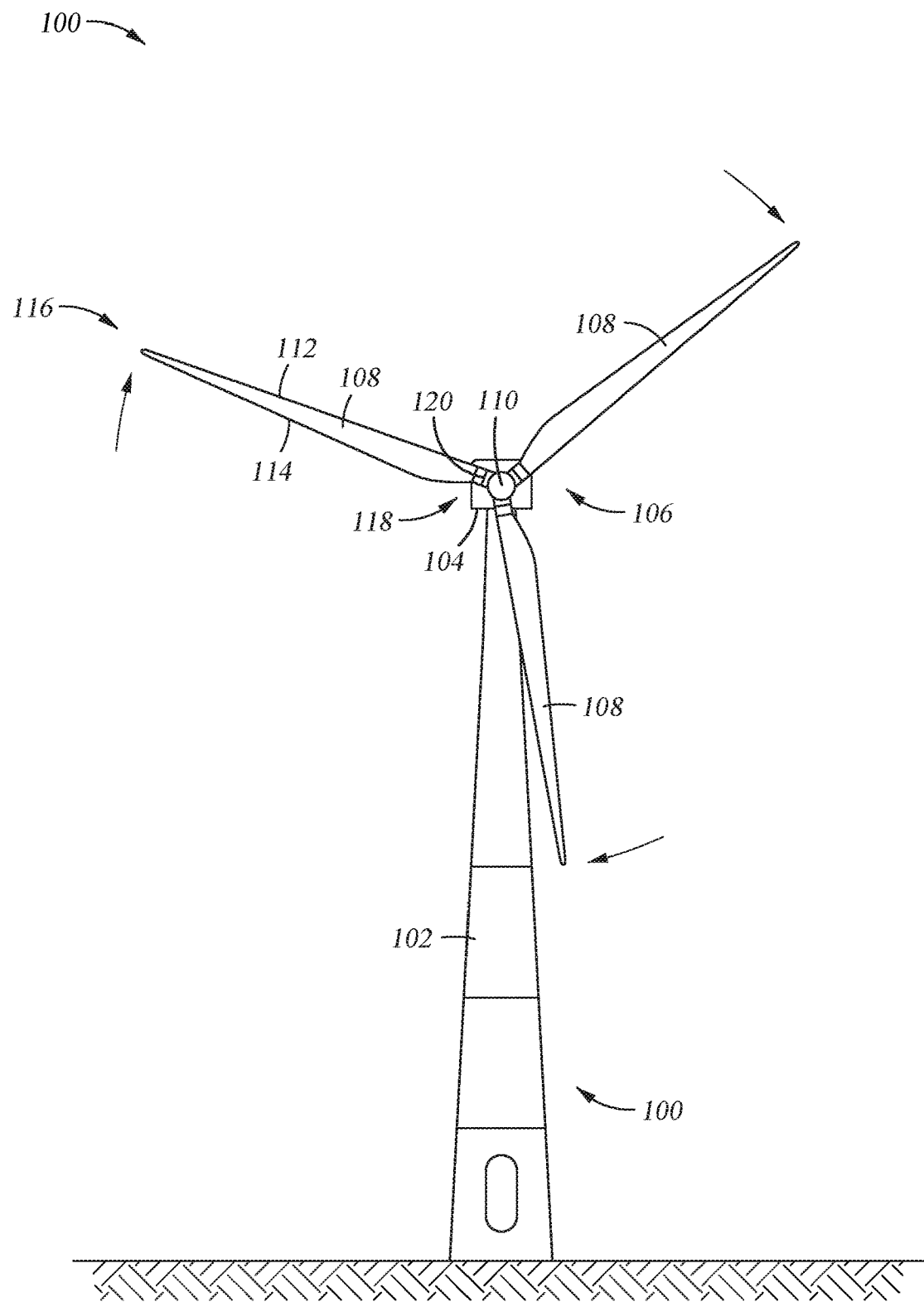
FIG. 1 illustrates a diagrammatic view of an exemplary wind turbine, according to one or more embodiments.

FIG. 1 illustrates a diagrammatic view of an exemplary wind turbine 100. Although the wind turbine 100 is illustrated as a horizontal-axis wind turbine, the principles and techniques described herein may be applied to other wind turbine implementations, such as vertical-axis wind turbines. The wind turbine 100 typically comprises a tower 102 and a nacelle 104 located at the top of the tower 102. A rotor 106 may be connected with the nacelle 104 through a low-speed shaft extending out of the nacelle 104. As shown, the rotor 106 comprises three rotor blades 108 mounted on a common hub 110 which rotate in a rotor plane, but the rotor 106 may comprise any suitable number of blades, such as one, two, four, five, or more blades. The blades 108 (or airfoil) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120, such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Although not depicted in FIG. 1, alternate implementations of the wind turbine 100 may include multiple rotors 106 connected with the nacelle 104 (or with multiple nacelles 104). In such implementations, the tower 102 may comprise one or more structural members that are configured to provide the multiple rotors 106 with a desired arrangement (e.g., with non-overlapping rotor planes).

Figure 2:
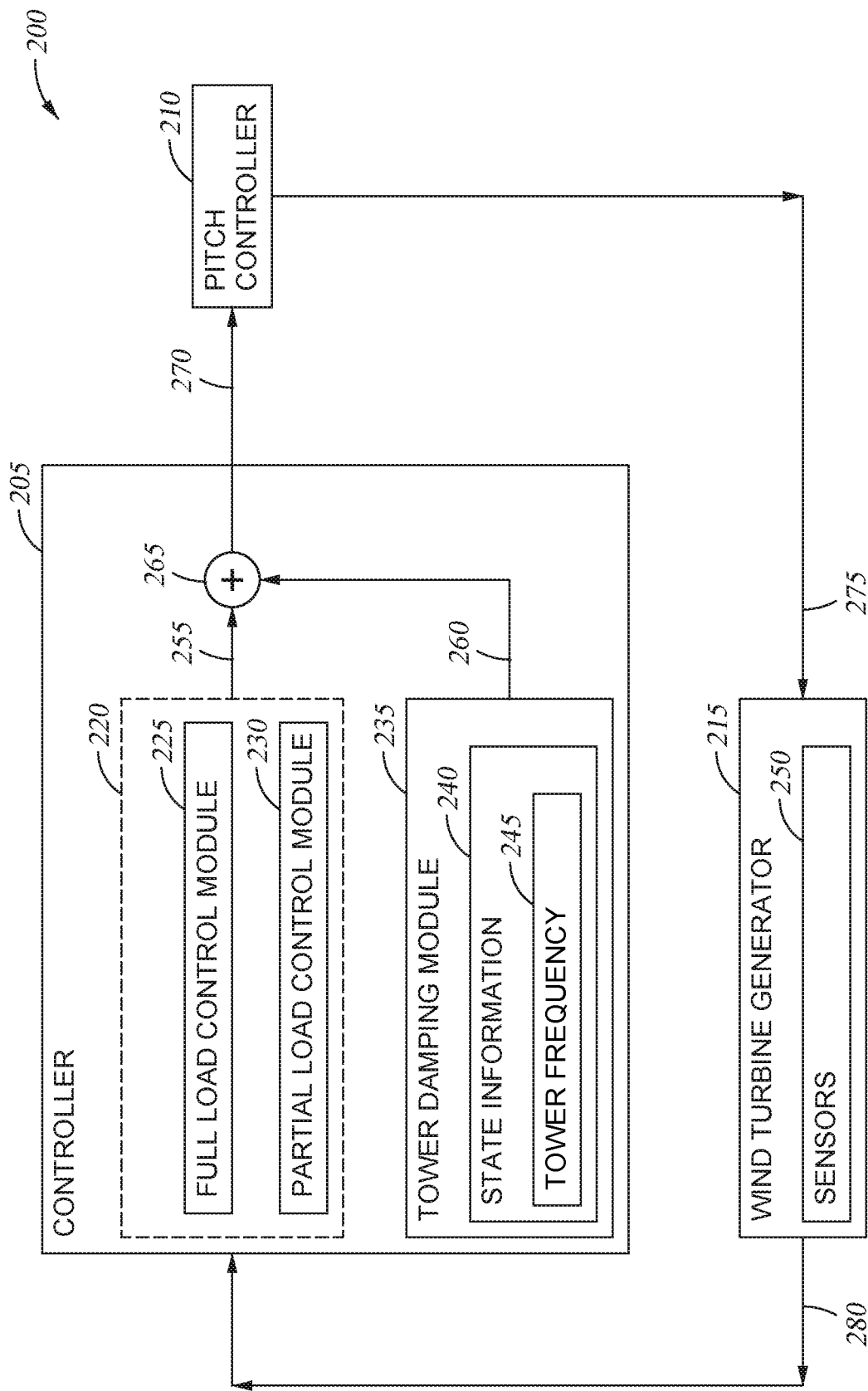
FIG. 2 is a block diagram of an exemplary wind turbine, according to one or more embodiments.

FIG. 2 is a block diagram of an exemplary wind turbine 200, according to one or more embodiments. The wind turbine 200 may be used in conjunction with other embodiments described herein. For example, the wind turbine 200 represents one possible implementation of the wind turbine 100 illustrated in FIG. 1. The wind turbine 200 comprises a controller 205 coupled with a pitch controller 210 and with a wind turbine generator 215. The controller 205 is configured to receive one or more sensor signals 280, and to generate one or more control signals for controlling a rotational speed of a rotor of the wind turbine 200.

The controller 205 comprises one or more computer processors (or "processors") and a memory. The one or more processors represent any number of processing elements that each can include any number of processing cores. Some non-limiting examples of the one or more processors include a microprocessor, a digital signal processor (DSP), an application-specific integrated chip (ASIC), and a field programmable gate array (FPGA), or combinations thereof.

The memory can include volatile memory elements (such as random access memory), non-volatile memory elements (such as solid-state, magnetic, optical, or Flash-based storage), and combinations thereof. Moreover, the memory can be distributed across different mediums (e.g., network storage or external hard drives). The memory may include a plurality of "modules" for performing various functions described herein. In one embodiment, each module includes program code that is executable by one or more of the processors. However, other embodiments may include modules that are partially or fully implemented in hardware (i.e., circuitry) or firmware.

The one or more sensor signals 280 may comprise any suitable information related to rotor dynamics and/or tower dynamics. In one non-limiting example, the one or more sensor signals 280 comprise a generator speed of the wind turbine generator 215 and a tower acceleration.

In some embodiments, the controller 205 comprises a full load control module 225, a partial load control module 230, and a tower damping module 235. The full load control module 225 is configured to control power production by the wind turbine generator 215 during wind conditions that are suitable for producing at least a rated power of the wind turbine 200. The partial load control module 230 is configured to control power production by the wind turbine generator 215 during wind conditions that are not suitable for producing the rated power of the wind turbine 200. For example, the full load control module 225 may control power production when a measured wind speed is greater than or equal to a rated wind speed of the wind turbine 200, and the partial load control module 230 may control power production when the measured wind speed is less than the rated wind speed.

The wind turbine generator 215 may have any suitable implementation, such as a synchronous generator, an induction generator, a permanent magnet generator, and so forth. Further, the wind turbine generator 215 may be configured as a doubly-fed induction generator (DFIG), for full-scale power conversion, and so forth.

In some embodiments, the full load control module 225 operates to control a pitch of the one or more rotor blades to avoid undesired conditions of the wind turbine 200. For example, the full load control module 225 may pitch rotor blades out of the wind to prevent the wind turbine generator 215 from an overspeeding condition. In some embodiments, the partial load control module 230 operates to control a pitch of the one or more rotor blades to an optimal pitch angle. Although the wind turbine generator 215 is unable to produce the rated power while operating in the partial load control regime, the optimal pitch angle permits a maximum amount of energy to be captured from the wind while increasing the speed of the wind turbine generator 215. As mentioned above, the controller 205 may transition from the partial load control regime to the full load control regime when the measured wind speed reach a rated wind speed of the wind turbine.

In some embodiments, the full load control module 225 and the partial load control module 230 may be implemented within a rotor speed controller 220. The rotor speed controller 220 is generally responsive to rotor dynamics and may be insensitive or agnostic to tower dynamics. The rotor speed controller 220 may further comprise switching logic configured to determine when to switch between the respective control regimes provided by the full load control module 225 and the partial load control module 230. In some embodiments, the switching logic receives the measured wind speed as an input and may receive information from one or other wind conditions and/or wind turbine conditions.

The tower damping module 235 is configured to determine dynamic state information (state information 240) for a tower of the wind turbine 200, and to generate one or more control signals for controlling the rotational speed of the rotor. In some embodiments, the state information 240 comprises one or more of acceleration information, velocity information, and position information for the tower along one or more suitable dimensions. In some embodiments, the sensors 250 include an accelerometer arranged at a reference location of the tower, and the one or more sensor signals 280 comprises acceleration information provided by the accelerometer. For example, the accelerometer may be arranged at a top of the tower, although other locations are also possible. In some embodiments, the tower damping module 235 is configured to generate velocity information and/or position information using the received acceleration information. In other embodiments, the sensors 250 may comprise one or more sensors that are configured to directly measure the velocity information and/or the position information for the tower, which may be provided to the tower damping module 235.

In some embodiments, the state information 240 comprises a tower frequency 245 along one or more suitable dimensions. The tower frequency 245 may comprise a fundamental frequency of the tower. Some non-limiting examples of the suitable dimensions include a fore-and-aft dimension that generally corresponds to the direction of the wind at the wind turbine 200 (e.g., assuming the rotor is yawed to align with the direction of the wind), and a side-to-side dimension that is generally orthogonal to the direction of the wind. In another example involving a wind turbine comprising multiple rotors, the tower frequency 245 may comprise a torsion about the tower.

In some embodiments, the tower damping module 235 is configured to determine the tower frequency 245 using at least one of velocity information and position information. For example, the tower damping module 235 may determine frequency information (or "frequency content") that is included in the position information, e.g., by performing a Fast Fourier Transform (FFT) on the position information. Other frequency analysis techniques are also possible. Generally, a greater tower frequency 245 corresponds to a stiffer tower, and a lesser tower frequency 245 corresponds to a more flexible tower. In one non-limiting example, determining the tower frequency 245 may be dynamically performed by the tower damping module 235 during power production of the wind turbine. In another non-limiting example, determining the tower frequency 245 may be performed by the tower damping module 235 during a shutdown period of the wind turbine. In another non-limiting example, determining the tower frequency 245 may be performed during a commissioning process for the wind turbine. In another non-limiting example, the tower frequency 245 may be provided to the tower damping module 235 via user input.

As mentioned above, the tower damping module 235 is configured to generate is one or more control signals using the state information 240. In some embodiments, the rotor speed controller 220 (more specifically, a selected one of the full load control module 225 and the partial load control module 230) is configured to generate a pitch reference signal 255, and the tower damping module 235 is configured to produce a pitch reference offset signal 260 that is combined with the pitch reference signal 255. In some embodiments, the pitch reference signal 255 corresponds to a commanded power production of the wind turbine, whether from the full load control module 225 or the partial load control module 230. In some embodiments, the controller 205 may add the pitch reference signal 255 with the pitch reference offset signal 260 at an adder 265, which outputs a pitch reference signal 270.

In some embodiments, the controller 205 provides the pitch reference signal 270 to a pitch controller 210 to control a pitch of one or more rotor blades of the wind turbine 200. In turn, the pitch controller 210 outputs pitch values 275 to control the wind turbine generator 215 (more specifically, a rotational speed of the rotor). In some embodiments, the pitch controller 210 is implemented separate from the controller 205. In alternate embodiments, the functionality of the pitch controller 210 may be integrated into the controller 205.

Thus, with the functionality provided by the tower damping module 235, the controller 205 can be responsive to rotor dynamics, tower dynamics, and a rotor-wind relation. In some embodiments, the rotor-wind relation comprises an effective wind speed experienced at the rotor, which may be represented as a difference between the free wind speed and a velocity of the tower. Further, by accounting for the effects of the rotor dynamics and/or the rotor-wind relation using the tower damping module 235 allows the full load control module 225 to be tuned more aggressively than would be otherwise possible. Still further, although described above in terms of tower dynamics, it will be noted that the techniques discussed with relation to the tower damping module 235 may be applicable to other types of structures to mitigate torsional instabilities.

Figure 3:
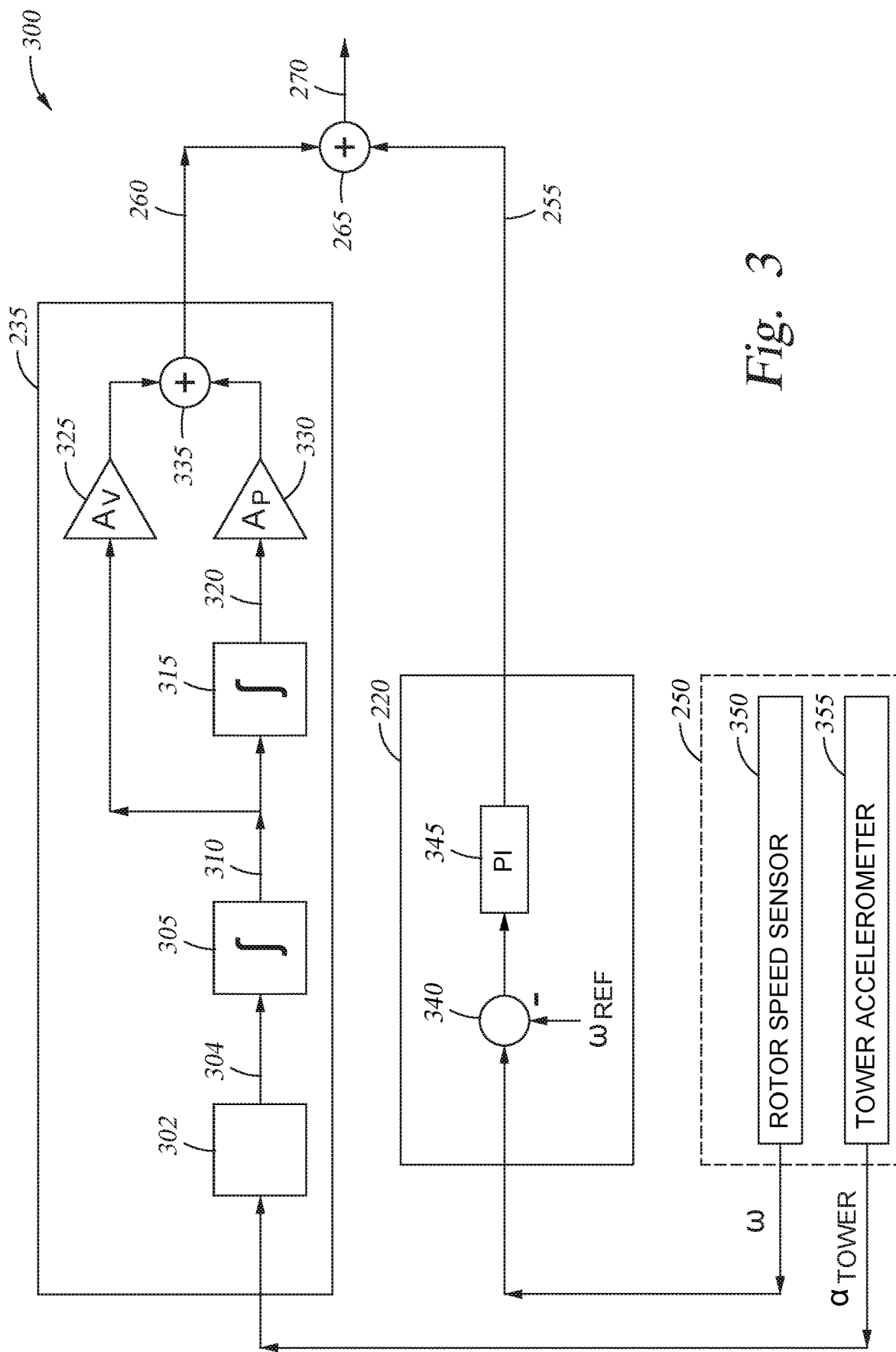
FIG. 3 is a block diagram illustrating controlling a rotational speed of a wind turbine rotor using dynamic state information of a wind turbine tower, according to one or more embodiments.

FIG. 3 is a block diagram 300 illustrating controlling a rotational speed of a wind turbine rotor using dynamic state information of a wind turbine tower, according to is one or more embodiments. The features illustrated in the block diagram 300 may be used in conjunction with other embodiments described herein, such as the controller 205 depicted in FIG. 2.

The rotor speed controller 220 is configured to receive a generator speed w from a rotor speed sensor 350, and a reference generator speed $\omega_{ref}$. A subtractor 340 of the rotor speed controller 220 generates an error signal based on a difference of the generator speed $\omega$ and the reference generator speed $\omega_{ref}$. A proportional-integral (PI) controller 345 generates a pitch reference signal 255 using the error signal.

The tower damping module 235 is configured to receive a tower acceleration $\alpha_{Tower}$ from a tower accelerometer 355. The tower damping module 235 comprises a filter module 302 configured to filter the tower acceleration $\alpha_{Tower}$ to produce filtered acceleration information 304. A first integrator 305 is configured to produce velocity information 310 from the filtered acceleration information 304, and a second integrator 315 is configured to produce position information 320 from the velocity information 310. As discussed above, in other embodiments, the sensors 250 may comprise one or more sensors that are configured to directly measure the velocity information 310 and/or the position information 320.

The filter module 302 may comprise one or more filtering stages to produce the filtered acceleration information 304. In some embodiments, the filter module 302 may be configured to remove low-frequency components from the tower acceleration $\alpha_{Tower}$, such as direct current (DC) components. In some embodiments, the filter module 302 may be configured to perform anti-aliasing of the tower acceleration $\alpha_{Tower}$. In some embodiments, the filter module 302 may be configured to filter frequency components associated with rotation of the rotor, such as a 3P frequency. Any suitable cutoff frequencies may be selected for the various filtering stages. Further, the filtering stages may be adaptively updated during operation of the wind turbine, e.g., based on wind conditions.

In some embodiments, the first integrator 305 and/or the second integrator 310 may be implemented as "leaky" integrators (e.g., a first-order low-pass filter (LPF) having a cutoff frequency significantly less than frequencies of interest). For example, the cutoff frequencies for the first integrator 305 and/or the second integrator 310 may be selected to prevent introducing too much phase lead at frequencies near the tower frequency 245.

A first amplifier 325 of the tower damping module 235 has a first control loop gain value (i.e., velocity gain $A_v$) to be applied to the velocity information 310. A second amplifier 330 of the tower damping module 235 has a second control loop gain value (i.e., position gain $A_p$) to be applied to the position information 320. An adder 335 sums the outputs of the first amplifier 325 and the second amplifier 330 to produce the pitch reference offset signal 260. The adder 265 receives the pitch reference signal 255 and the pitch reference offset signal 260, and outputs the pitch reference signal 270.

In some embodiments, the first control loop gain value and/or the second control loop gain value may be dynamically updated using the dynamic state information for the tower of the wind turbine. For example, at least one control loop gain value may be determined using a determined tower frequency.

As shown, the tower damping module 235 is configured to output a pitch reference offset signal 260 having a velocity component based on the velocity information 310 and a position component based on the position information 320. In one alternate implementation, the pitch reference offset signal 260 may have only one of the velocity component and the position component. In another alternate implementation, the pitch reference offset signal 260 may have an acceleration component based on the tower acceleration $\alpha_{Tower}$. The acceleration component may be in addition to, or may be separate from, the velocity component and/or the position component.

In some embodiments, the tower damping module 235 has a predefined tuning specific to the wind turbine platform. The predefined tuning may comprise a predefined first set of values (e.g., the velocity gain $A_v$ and/or the position gain $A_p$), which may then be adaptively updated during operation of the wind turbine. In this way, the tower damping module 235 may be implemented for various wind turbines independent of their geographic location. Stated another way, the tower damping module 235 does not require a site-specific tuning to be performed prior to the operation of the wind turbine.

Figure 4:
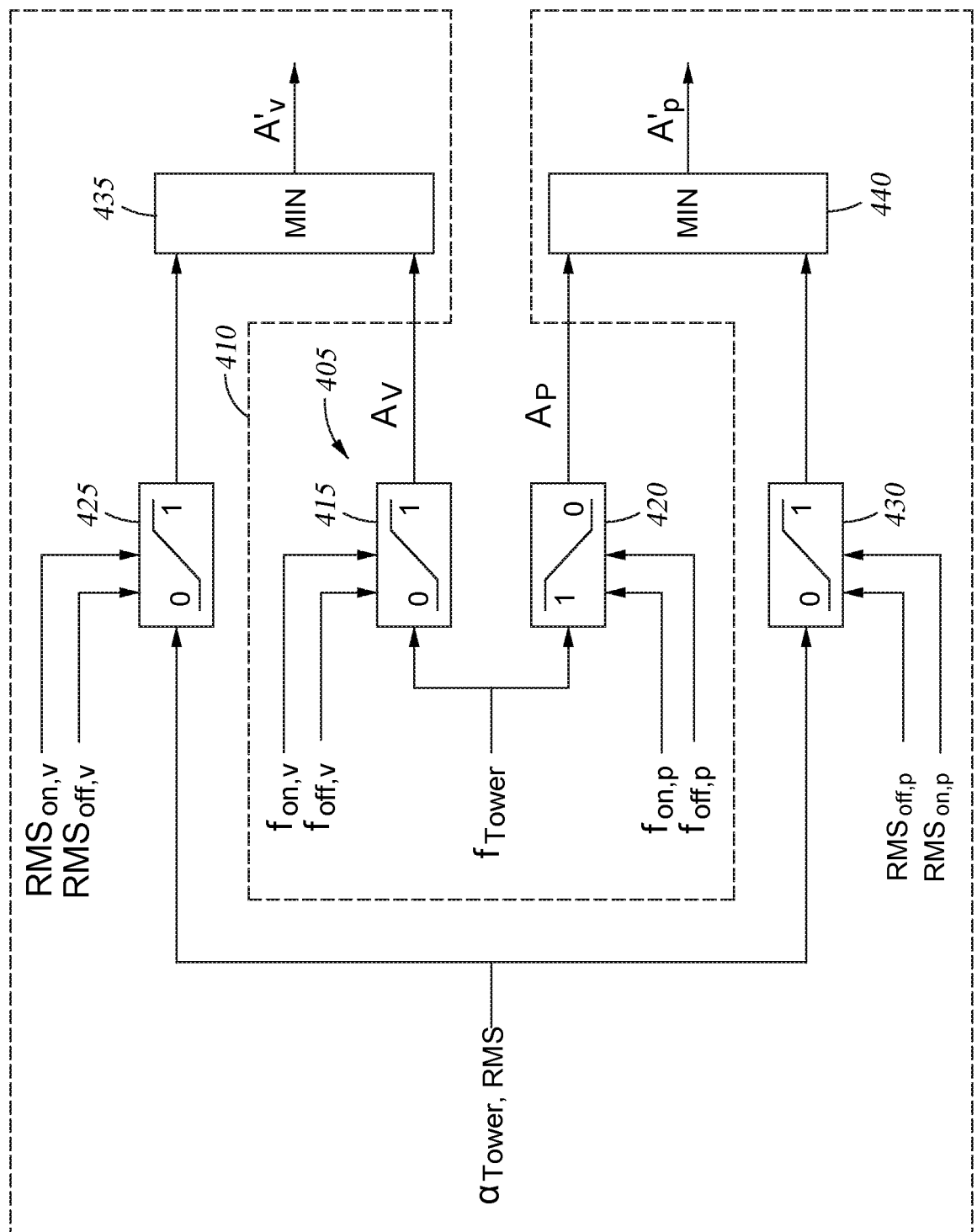
FIG. 4 is a block diagram illustrating determining control loop gain values using dynamic state information of a wind turbine tower, according to one or more embodiments.

FIG. 4 is a block diagram 400 illustrating determining control loop gain values using dynamic state information of a wind turbine tower, according to one or more embodiments. The features illustrated in the block diagram 400 may be used in conjunction with other embodiments described herein, such as implemented in the tower damping module 325 depicted in FIG. 3. Further, the features illustrated in the block diagram 400 may be used during full load operation and/or during partial load operation of the wind turbine.

In some embodiments, an adaptation module 405 is configured to determine at least one control loop gain value using a tower frequency $f_{Tower}$. As discussed above, the tower frequency $f_{Tower}$ may be determined using frequency information included in the position information. The adaptation module 405 comprises a first gain scheduling module 415 configured to schedule a first control loop gain value (i.e., velocity gain $A_v$), and a second gain scheduling module 420 configured to schedule a second control loop gain value (i.e., position gain $A_p$).

As shown, the first control loop gain value and the second control loop gain value are each selected within a range between zero (0) and one (1). Alternate implementations may schedule the first control loop gain value and/or the second control loop gain value from any suitable range(s). Further, the range for the first control loop gain value and the range for the second control loop gain value need not be the same.

For values of the tower frequency $f_{Tower}$ that are less than a first threshold frequency $f_{off,v}$, the velocity gain $A_v$ has a zero value. For values of the tower frequency $f_{Tower}$ that are greater than a second threshold frequency $f_{on,v}$, the velocity gain $A_v$ has a one value. For values of the tower frequency $f_{Tower}$ between the first threshold frequency $f_{off,v}$ and the second threshold frequency $f_{on,v}$, the velocity gain $A_v$ has values adapted according to a predefined function. Thus, in some embodiments, the adaptation module 405 is configured to, responsive to determining that the tower frequency $f_{Tower}$ is less than a first threshold frequency $f_{off,v}$, deactivate or detune a first control loop associated with the first control loop gain value (velocity gain $A_v$). Beneficially, certain effects of the velocity-based feedback can be mitigated by deactivating or detuning the first control loop, such as mitigating a destabilizing effect when employed with relatively flexible towers.

For values of the tower frequency $f_{Tower}$ that are less than a first threshold frequency $f_{on,p}$, the position gain $A_p$ has a one value. For values of the tower frequency $f_{Tower}$ that are greater than a second threshold frequency $f_{off,p}$, the position gain $A_p$ has a zero value. For values of the tower frequency flower between the first threshold frequency $f_{on,p}$ and the second threshold frequency $f_{off,p}$, the position gain $A_p$ has values adapted according to a predefined function. Thus, in some embodiments, the adaptation module 405 is configured to, responsive to determining that the tower frequency $f_{Tower}$ is greater than a second threshold frequency $f_{off,p}$, deactivate or detune a second control loop associated with the second control loop gain value (position gain $A_p$).

In some embodiments, the predefined functions associated with the velocity gain $A_v$ and the position gain $A_p$ are substantially linear. However, any other suitable functions are also contemplated (e.g., quadratic).

In some embodiments, an optional adaptation module 410 is configured to receive the first control loop gain value (velocity gain $A_v$) and the second control loop gain value (position gain $A_p$), and to generate adapted control loop gain values $A'_v$, $A'_p$ to apply to the respective control loops. In this way, the adaptation module 410 may mitigate certain effects of the velocity-based feedback and/or position-based feedback. For example, the adaptation module 410 may limit application of control loop gain values to mitigate wear on the pitch system. The adaptation module 410 comprises a first gain scheduling module 425 configured to schedule a first adapted gain value, and a second gain scheduling module 430 configured to schedule a second adapted gain value.

For values of a mean tower acceleration $\alpha_{Tower,RMS}$ that are less than a first threshold acceleration $RMS_{off,v}$, the first gain scheduling module 425 outputs a zero value. For values of the mean tower acceleration $\alpha_{Tower,RMS}$ that are greater than a second threshold acceleration $RMS_{on,v}$, the first gain scheduling module 425 outputs a one value. For values of the mean tower acceleration $\alpha_{Tower,RMS}$ between the first threshold acceleration $RMS_{off,v}$ and the second threshold acceleration $RMS_{on,v}$, the first gain scheduling module 425 outputs values adapted according to a predefined function. The value output by the first gain scheduling module 425 and the first control loop gain value (velocity gain $A_v$) are compared at a minimum block 435 and the minimum value is output as the adapted control loop gain value $A'_v$.

Thus, in some embodiments, the first gain scheduling module 425 is configured to enable, disable, or otherwise limit the functionality of the first gain scheduling module 415. For example, the first gain scheduling module 425 may mitigate wear on the pitch system by enabling the first gain scheduling module 415 only when oscillations of the tower exceed a predefined amplitude.

For values of the mean tower acceleration $\alpha_{Tower,RMS}$ that are less than a first threshold acceleration $RMS_{off,p}$, the second gain scheduling module 430 outputs a zero value. For values of the mean tower acceleration $\alpha_{Tower,RMS}$ that are greater than a second threshold acceleration $RMS_{on,p}$, the second gain scheduling module 430 outputs a one value. For values of the mean tower acceleration $\alpha_{Tower,RMS}$ between the first threshold acceleration $RMS_{off,p}$ and the second threshold acceleration $RMS_{on,p}$, the second gain scheduling module 430 outputs values adapted according to a predefined function. The value output by the second gain scheduling module 430 and the second control loop gain value (position gain $A_p$) are compared at a minimum block 440 and the minimum value is output as the adapted control loop gain value $A'_p$.

Thus, in some embodiments, the second gain scheduling module 430 is is configured to enable, disable, or otherwise limit the functionality of the second gain scheduling module 420. For example, the first gain scheduling module 425 may be used to prevent application of small values of the pitch reference offset signal to be applied during full load operation.

Although not explicitly shown, in some embodiments, the adaptation module 405 may comprise an additional gain scheduling module that affects the position gain $A_p$ as a function of the operating point of the wind turbine. The full load control module (e.g., the full load control module 225 of FIG. 2) may include a comparable functionality. The output values from the additional gain scheduling module need not be bound to a zero-to-one range but may have any suitable values.

Figure 5:
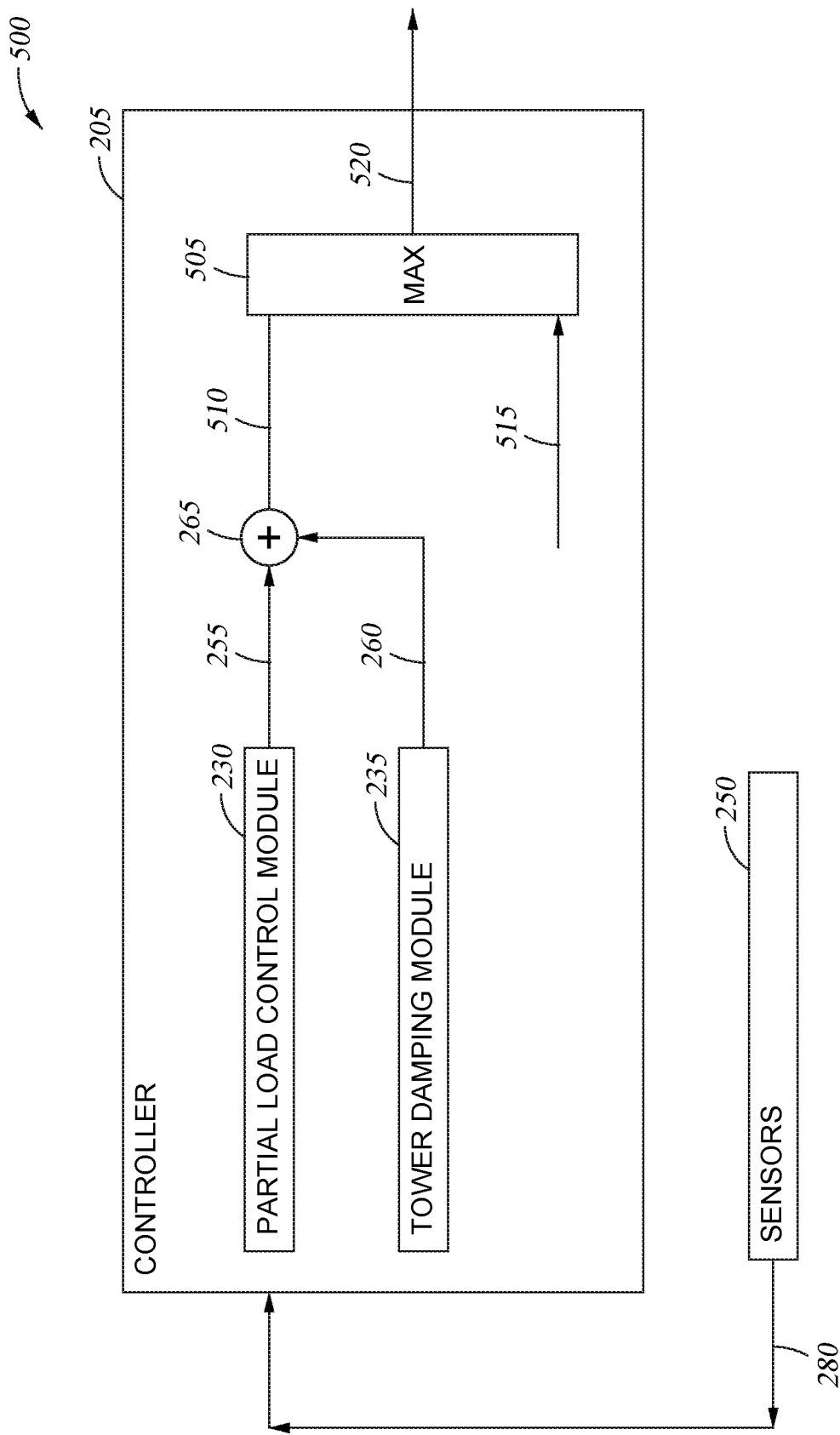
FIG. 5 is a block diagram illustrating adapting a pitch reference signal during partial load operation, according to one or more embodiments.

FIG. 5 is a block diagram 500 illustrating adapting a pitch reference signal during partial load operation, according to one or more embodiments. The features illustrated in the block diagram 500 may be used in conjunction with other embodiments described herein, such as implemented in the controller 205 depicted in FIG. 2.

The partial load control module 230 is configured to produce the pitch reference signal 255. In some embodiments, the pitch reference signal 255 reflects a maximum collective pitch angle from a plurality of pitch angles calculated by the partial load control module 230 according to one or more predefined parameters. For example, the partial load control module 230 may calculate a first pitch angle corresponding to a maximum (or other desired) power production level, a second pitch angle corresponding to a thrust limitation parameter, a third pitch angle corresponding to a noise limitation parameter, a fourth pitch angle corresponding to a yaw error parameter, and so forth.

The tower damping module 235 is configured to produce the pitch reference offset signal 260, and the adder 265 is configured to output the pitch reference signal 510 to a saturation block 505. The pitch reference signal 510 and a saturation pitch reference signal 515 are compared at the saturation block 505 and the maximum value is output as a maximum pitch reference signal 520. Use of the maximum pitch reference signal 520 may be beneficial to prevent a rotor blade stall, to reduce noise emissions, and so forth.

In some embodiments, the saturation pitch reference signal 515 comprises the pitch reference signal 255. In such a case, the controller 205 allows the rotor blades only to be pitched out of the wind from the pitch angle commanded by the pitch reference signal 255. Stated another way, the value of the maximum pitch reference signal 520 will not be less than the pitch reference signal 255 prior to application of the tower damping functionality. In other embodiments, the saturation pitch reference signal 515 comprises a pitch reference signal corresponding to a maximum power production level for an operation point of the wind turbine. The maximum power production level generally corresponds to a pitch angle at which the wind turbine extracts as much power as possible from the wind. In this case, the saturation pitch reference signal 515 may further comprise a pitch offset. For such an implementation, the controller 250 allows the rotor blades to be pitched into the wind depending on the operation point of the wind turbine (e.g., during thrust-limited operation). Stated another way, for an implementation of the partial load control module 230 comprising a first pitch angle corresponding to the maximum power production level and at least a second pitch angle corresponding to another operational parameter (such as thrust limitation, noise limitation, yaw error, etc.), the value of the maximum pitch reference signal 520 may be less than the pitch reference signal 255 when the partial load control module 230 is controlled according to the second pitch angle. Other implementations of the controller 205 may include any other suitable signals as the saturation pitch reference signal 515.

During partial load operation, the tower damping module 235 may suffer from estimation errors for frequencies that are lower than the tower frequency 245. These estimation errors may be amplified when estimating velocity information and position information from measured acceleration information, and may be reflected in the pitch reference offset signal 260. The estimation errors may not have a substantial effect during full load operation, as the pitch reference offset signal 260 can be viewed as a disturbance occurring between the controller 205 and the pitch system. However, the estimation errors may have a more substantial effect during partial load operation.

Typically, the partial load control module 230 may control rotor speed by regulating a power reference, while the corresponding pitch angle may be determined via look-up tables and/or relations to quantities measured from one or more sensor signals 280 (e.g., rotor speed, wind speed, etc.). During partial load operation, as there is not a closed-loop control for the pitch angle (e.g., including an integrator), the low-frequency variations introduced by the tower damping module 235 may be input directly into the commanded pitch angle of the pitch reference offset signal 260, which causes low-frequency thrust variations and may hinder performance of the wind turbine.

To mitigate the amplification of low-frequency content that may occur during partial load operation, in some embodiments the controller 205 is configured to retune filter(s) of the tower damping module 235 (e.g., the filter module 302, the first integrator 305, and/or the second integrator 310 of FIG. 3). For example, the controller 205 may retune one or more high-pass filters (HPFs) of the tower damping module 235 to be closer to the operating region to mitigate low-frequency content at the expense of phase lead at frequencies near the tower frequency 245. However, in some cases the retuned filter(s) may correspond to reduced performance during full load operation. Therefore, in some embodiments, the controller 205 may retune the filter(s) responsive to transitioning into partial load operation. In some embodiments, the controller 205 may retune the filter(s) (e.g., returning the filter(s) to their original tuning) responsive to transitioning into full load operation.

Figure 6:
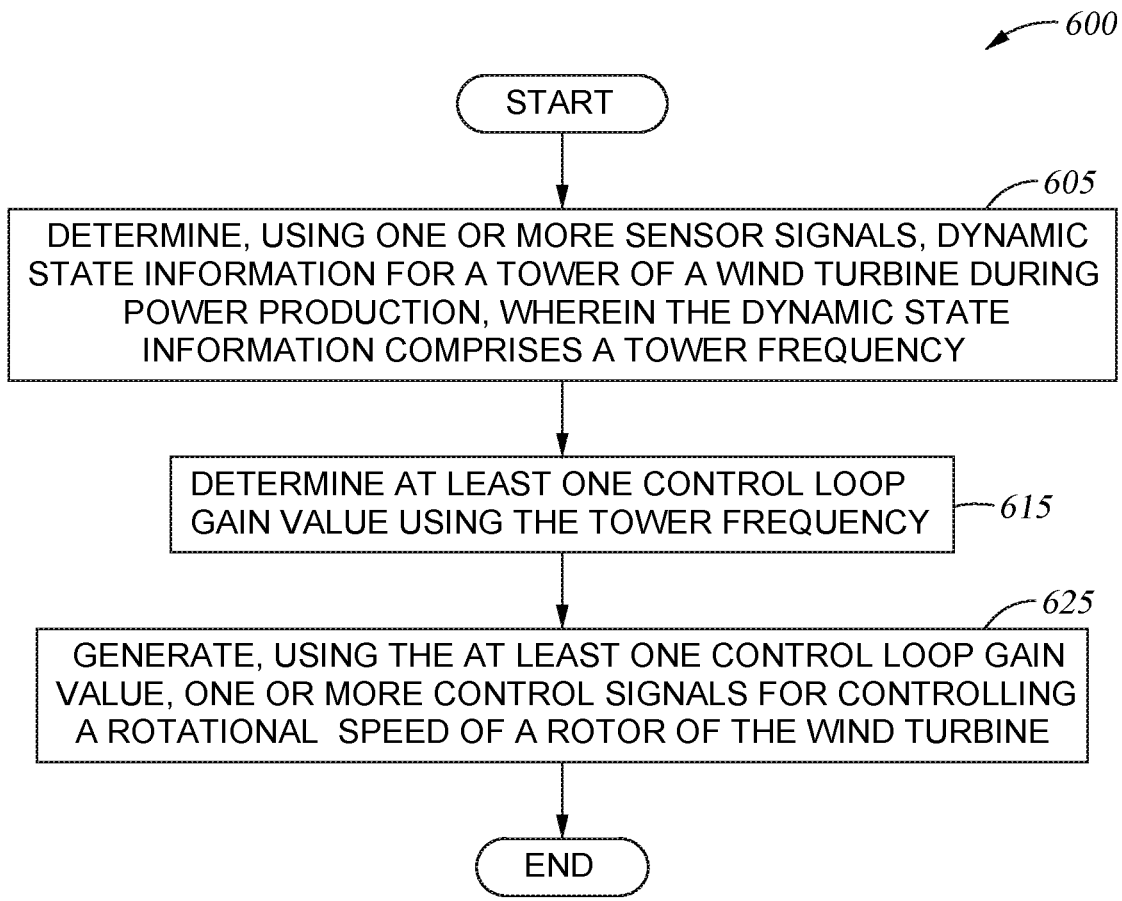
FIG. 6 illustrates an exemplary method of controlling a rotational speed of a wind turbine rotor using dynamic state information of a wind turbine tower, according to one or more embodiments.

FIG. 6 illustrates an exemplary method 600 of controlling a rotational speed of a wind turbine rotor using dynamic state information of a wind turbine tower, according to one or more embodiments. The method 600 may be used in conjunction with other embodiments, such as being performed using the controller 205 depicted in FIG. 2.

Method 600 begins at block 605, where the controller determines, using one or more sensor signals, dynamic state information for a tower of a wind turbine during power production. In some embodiments, the dynamic state information comprises a tower frequency. At block 615, the controller determines at least one control loop gain value using the tower frequency. In some embodiments, the controller determines a first control loop gain value to be applied to velocity information corresponding to a reference location of the tower, and a second control loop gain value to be applied to position information corresponding to the reference location. At block 625, the controller generates, using the at least one control loop gain value, one or more control signals for controlling a rotational speed of a rotor of the wind turbine. In some embodiments, the one or more control signals comprises a pitch reference signal to control a pitch of one or more rotor blades of the wind turbine, Method 600 ends following completion of block 625.

Figure 7:
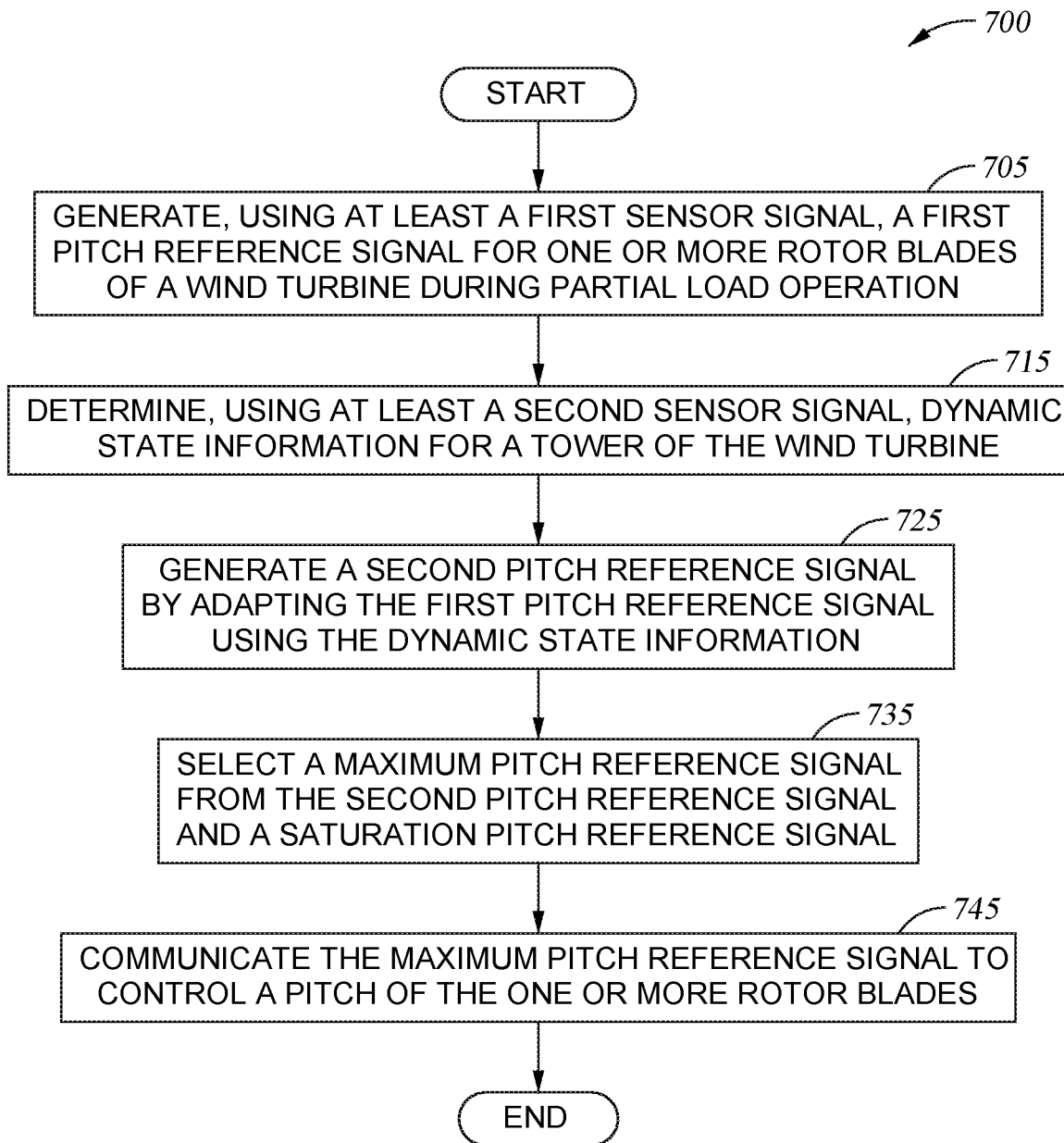
FIG. 7 illustrates an exemplary method of adapting a pitch reference signal during partial load operation, according to one or more embodiments.

FIG. 7 illustrates an exemplary method 700 of adapting a pitch reference signal during partial load operation, according to one or more embodiments. The method 600 may be used in conjunction with other embodiments, such as being performed using the controller 205 depicted in FIG. 5.

Method 700 begins at block 705, where the controller generates, using at least a first sensor signal, a first pitch reference signal for one or more rotor blades of a wind turbine during partial load operation. In some embodiments, the first sensor signal comprises a rotational speed signal. At block 715, the controller determines, using at least a second sensor signal, dynamic state information for a tower of the wind turbine. In some embodiments, the second sensor signal comprises a tower acceleration signal. In some embodiments, the dynamic state information comprises a tower frequency.

At block 725, the controller generates a second pitch reference signal by adapting the first pitch reference signal using the dynamic state information. In some embodiments, generating the second pitch reference signal comprises generating a pitch reference offset signal using the dynamic state information. In some embodiments, adapting the first pitch reference signal comprises summing the pitch reference offset signal with the first pitch reference signal.

At block 735, the controller selects a maximum pitch reference signal from the second pitch reference signal and a saturation pitch reference signal. In some embodiments, the saturation pitch reference signal is the same as the first pitch reference signal. In other embodiments, the saturation pitch reference signal corresponds to a maximum power production level.

At block 745, the controller communicates the maximum pitch reference signal to control a pitch of the one or more rotor blades. In some embodiments, the controller communicates the maximum pitch reference signal with an external pitch controller. Method 700 ends following completion of block 745.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages described herein are merely illustrative and are not considered elements or limitations of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method comprising:
   determining, using one or more sensor signals, dynamic state information for a tower of a wind turbine during power production, wherein determining the dynamic state information comprises:
   determining, using the one or more sensor signals, a velocity and a position of a reference location of the tower; and
   determining a tower frequency based on the one or both of the velocity and the position;
   determining, using the tower frequency, a first control loop gain value and a second control loop gain value; and
   generating, one or more control signals for controlling a rotational speed of a rotor of the wind turbine by applying the first control loop gain value to the velocity and the second control loop gain value to the position.

2. The method of claim 1, further comprising:
responsive to determining that the tower frequency is less than a first threshold frequency, deactivating or detuning a first control loop associated with the first control loop gain value.

3. The method of claim 1, further comprising:
responsive to determining that the tower frequency is greater than a second threshold frequency, deactivating or detuning a second control loop associated with the second control loop gain value.

4. The method of claim 1, wherein generating the one or more control signals comprises:
generating a pitch reference signal to control a pitch of one or more rotor blades of the wind turbine, wherein generating the pitch reference signal comprises:
generating a first pitch reference signal corresponding to a commanded power production of the wind turbine;
generating a pitch reference offset signal using the dynamic state information; and
adding the pitch reference offset signal to the first pitch reference signal to generate the pitch reference signal.

5. A controller for a wind turbine, the controller comprising:
one or more computer processors; and
a non-transitory memory comprising computer-readable code that, when executed using the one or more computer processors, performs an operation comprising:
determining, using one or more sensor signals, dynamic state information for a tower of a wind turbine during power production, wherein determining the dynamic state information comprises:
determining, using the one or more sensor signals, one or both of a velocity and a position of a reference location of the tower; and
determining a tower frequency based on the one or both of the velocity and the position;
determining, using the tower frequency, a first control loop gain value and a second control loop gain value; and
generating, one or more control signals for controlling a rotational speed of a rotor of the wind turbine by applying the first control loop gain value to the velocity and the second control loop gain value to the position.

6. The controller of claim 5, the operation further comprising:
responsive to determining that the tower frequency is less than a first threshold frequency, deactivating or detuning a first control loop associated with the first control loop gain value.

7. The controller of claim 5, the operation further comprising:
responsive to determining that the tower frequency is greater than a second threshold frequency, deactivating or detuning a second control loop associated with the second control loop gain value.

8. The controller of claim 5, wherein generating the one or more control signals comprises:
generating a pitch reference signal to control a pitch of one or more rotor blades of the wind turbine, wherein generating the pitch reference signal comprises:
generating a first pitch reference signal corresponding to a commanded power production of the wind turbine;
generating a pitch reference offset signal using the dynamic state information; and
adding the pitch reference offset signal to the first pitch reference signal to generate the pitch reference signal.

9. A wind turbine comprising:
a tower;
a rotor disposed on the tower;
one or more sensors configured to generate one or more sensor signals; and
a controller coupled to the one or more sensors and configured to perform an operation comprising:
determining, using one or more sensor signals, dynamic state information for a tower of a wind turbine during power production, wherein determining the dynamic state information comprises:
determining, using the one or more sensor signals, one or both of a velocity and a position of a reference location of the tower; and
determining a tower frequency based on the one or both of the velocity and the position;
determining, using the tower frequency, a first control loop gain value and a second control loop gain value; and
generating, one or more control signals for controlling a rotational speed of a rotor of the wind turbine by applying the first control loop gain value to the velocity and the second control loop gain value to the position.

10. The wind turbine of claim 9, further comprising:
responsive to determining that the tower frequency is less than a first threshold frequency, deactivating or detuning a first control loop associated with the first control loop gain value.

11. The wind turbine of claim 9, further comprising:
responsive to determining that the tower frequency is greater than a second threshold frequency, deactivating or detuning a second control loop associated with the second control loop gain value.

12. The method of claim 1, wherein determining the first control loop gain value comprises:
determining, using the tower frequency applied to a first gain scheduler, a third control loop gain value;
determining a mean tower acceleration using the one or more sensor signals;
determining, using the mean tower acceleration applied to a second gain scheduler, a fourth control loop gain value; and
outputting a minimum control loop gain value of the third first control loop gain value and the fourth control loop gain value,
wherein generating the one or more control signals is based on the minimum control loop gain value.

13. The method of claim 12, wherein determining the fourth control loop gain value comprises:
comparing the mean tower acceleration with one or more threshold accelerations.

14. The method of claim 13, wherein determining the fourth control loop gain value further comprises:
when the mean tower acceleration is less than a first threshold acceleration, output a first value from the second gain scheduler, when the mean tower acceleration is greater than a second threshold acceleration, output a second value from the second gain scheduler, and when the mean tower acceleration is between the first threshold acceleration and the second threshold acceleration, output a third value according to a predefined function.

\* \* \* \* \*